(No Model.)
S. F. AMES.
SAWMILL HEAD BLOCK.
No. 490,131. Patented Jan. 17, 1893.
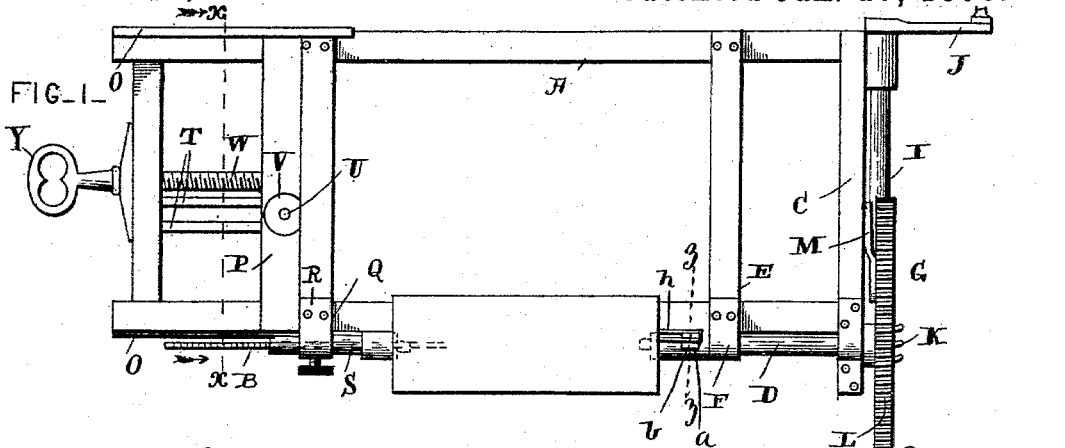
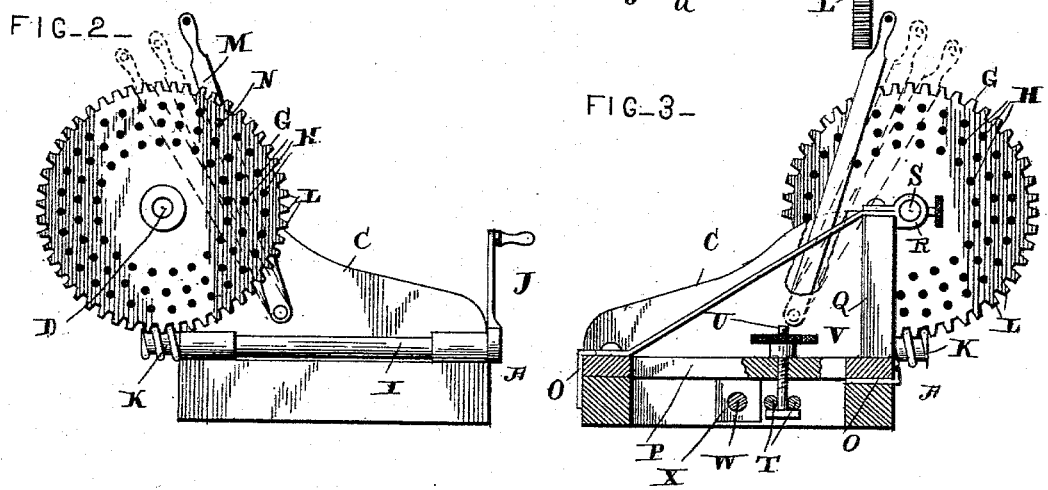
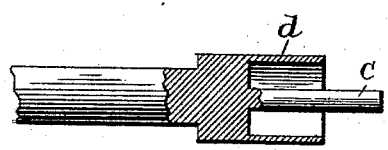
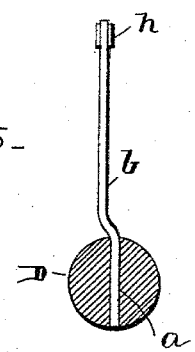
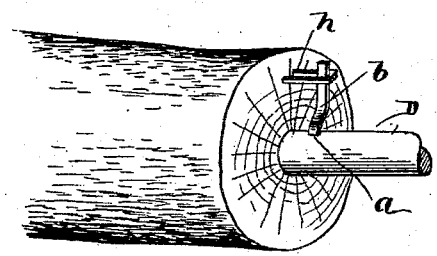
Witnesses
Geo. E. Fuch.
R. Fitzgerald.
Inventor
Samuel F. Ames
per Lehmann & Pattison
attys.

UNITED STATES PATENT OFFICE.

SAMUEL F. AMES, OF BEREA, KENTUCKY.

SAWMILL HEAD-BLOCK.

SPECIFICATION forming part of Letters Patent No. 490,131, dated January 17, 1893.

Application filed September 11, 1891. Serial No. 405,395. (No model.)

*To all whom it may concern:*

Be it known that I, SAMUEL F. AMES, of Berea, in the county of Madison and State of Kentucky, have invented certain new and useful Improvements in Sawmill Head-Blocks; and I do hereby declare the following to be a full, clear, and exact description of the invention, such as will enable others skilled in the art to which it pertains to make and use it, reference being had to the accompanying drawings, which form part of this specification.

My invention relates to an improvement in saw mill head blocks; and it consists in the construction, arrangement and combination of parts which will be fully described herein after and particularly referred to in the claim.

The object of my invention is to provide a saw mill head block to be set on top of the head block of an ordinary saw mill, which will saw a log radially toward its center for the purpose of manufacturing angular rails and posts like that shown in my patent granted to me June 30, 1891, No. 455,147, or any similar shape, and to so construct the machine that any desired number of rails of any desired thickness can be sawed from a log, and which will be regulated according to the size of the log being sawed.

In the drawings:—Figure 1 is a plan view of a saw mill head block which embodies my invention complete, the log being shown in position therein. Fig. 2 is an end view taken from the end having the regulating or dial wheel. Fig. 3 is a vertical section taken on the dotted line $x$—$x$ of Fig. 1. Fig. 4 is a longitudinal vertical section taken on the inner end of one of the log supporting spindles. Fig. 5 is a vertical cross section taken on the dotted line $z$—$z$ of Fig. 1 showing the arm for revolving the log. Fig. 6, is a perspective view of one end of the log showing the bent arm connected thereto.

A, indicates the saw mill head block, and B the saw which is at one side thereof. Extending upward from one end of the frame A, is a stationary support or frame C, which has its upper end to extend over the edge of the frame A, and journaled upon this extended end of the frame C, and outside of the edge of the frame A, as shown, is a horizontal shaft D. The opposite and inner end of this shaft D is journaled upon a support E, which extends upward from the said frame A, and the bearing F, placed thereon to receive the said shaft D is also placed outside of the inner edge of the frame A. Secured rigidly to the outer end of this shaft D, is a dial, gage or regulating wheel G, which is provided with a series of openings H, which extend around the said gage wheel at different distances from its center, for a purpose to be presently explained.

Journaled at the bottom, and outside side of the support or frame C, is a horizontal shaft I, which has its outer end provided with an operating handle or wheel J, and its inner end with a worm K, that engages teeth L formed upon the circumference of the wheel G. By means of this construction, the wheel G is revolved by the shaft I whenever it is desired to revolve the log that is being sawed. Pivoted to the outer side of this frame C, and inside of the wheel G is a stop or gage rod M, which is provided with a pin or projection N, that enters the perforations or openings which are made in the gage wheel, and locks the said wheel into any desired position. The upper end of this rod extends upward above the upper periphery of the wheel G so as to be convenient to operate, or to allow a rod to be connected therewith, by means of which it will be operated. This rod normally springs inward, so that the pin or projection N normally rests in one of the perforations of the wheel. As the rod is pivoted to the support or frame C, outside of the center of the wheel G, it will be readily understood, that by moving the said rod in or out it can be made to engage either series of perforations that it is desired, and thus regulate the number of pieces the log will be sawed into, as the distance between the perforations of the different series varies for that purpose.

Placed upon the frame A and sliding in longitudinal guide-ways O, is a longitudinally sliding frame P which is provided at its inner side with a vertical support Q which has a bearing or support R. Placed in this bearing R is an endwise adjustable spindle S, which supports the opposite end of the log from the shaft D. This spindle S is held in the bearing by means of a set screw or other convenient means, so that it can be moved endwise to allow logs of different lengths to be placed between its inner end, and the inner end of the shaft D. For the purpose of allowing a still further adjustment for the purpose of admitting logs of varying lengths, the frame P is capable of being moved endwise. The spindle S is also outside of the inner edge of the frame A, and in a line with the shaft D. The frame A is provided with two longitudinally extending parallel rods or bars T between which a screw bolt U passes, and this bolt is provided at its lower end with a head which prevents it from being pulled upward between the said rods. The upper end of this bolt passes through the frame P and is provided at its upper end with a suitable clamping nut V, by means of which the frame P is clamped into any desired adjustment, as will be readily understood. For the purpose of moving this frame P endwise, a rod W passes through the adjacent end of the frame A below the frame P and has its inner end screw threaded and passing into a screw threaded socket X upon the frame P. The outer end of this rod is provided with a handle Y by means of which it is operated. By rotating the rod W in either direction, the frame P can be moved back and forth upon the frame A.

The inner end of the shaft D is provided with a transverse opening $a$, which receives the inner end of a bar or arm $b$, and this arm $b$, is bent near its inner end to one side of the center of the shaft, for the purpose of extending therefrom outside of a line drawn radially through the center of the shaft, and parallel with the arm. The object of this construction will be explained farther on.

The inner ends of the shaft D and the spindle S are provided with the central pivotal points $c$, which are passed into suitable openings made in the center of the log to be sawed, and with the annular bands $d$, which extend around the spindles, and which are much larger as shown, and these bands are placed in annular grooves which are formed in any desired manner around, and concentric with the openings which receive the pivotal points $c$. By means of this construction, the bands hold the pieces of the log in position after being sawed, until the whole log is sawed, or as much of it as is desired, and the spindle S is moved endwise, to allow the log to be taken out, or if desired, the frame P may be moved endwise for this purpose. The object of having the bearings for the shaft and the spindle S outside of the inner edge of the frame A is to allow the saw B to enter the log for the first time directly under the center of the shaft and spindle.

The arm $b$, is secured to the log by means of a dog or staple $h$, which is driven into the end of the log, so that the log is revolved with the shaft D. The arm is preferably bent as shown, so that when it is down and secured to the end of the log, it will allow the saw to pass to one side thereof. The first position of the arm is down as shown, and then the log is gradually turned as it is sawed until the arm is up, where it is easily gotten at, when it is removed and turned around so as to bring the bend the other way, and as the log is continued on around, the reversal of the arm will allow the saw to pass when it is again down, and the log to be entirely sawed up.

By means of a saw mill head block of the above construction I am enabled to saw logs radially into any desired number of pieces, according to the size of the log, and to hold the log together until it is entirely sawed, the whole being simple in construction, and cheap to manufacture.

The head block above described is designed to be set on top of the head block of an ordinary mill, so that I am enabled to have two motions, one a circular motion and the other a horizontal motion, thus adapting a mill to saw logs as above described.

Having thus described my invention, I claim:—

In a saw mill head block, the combination of a frame, shafts journaled thereon outside of the inner side of the said frame, the inner end of each shaft having a band to enter the log and hold the sawed parts together, one of the shafts provided with a rotating gage wheel upon its outer end, and an arm having its inner end bent to one side and placed in an opening in the said shaft, whereby it is reversible and a dog for securing the outer end of the said arm to the log, substantially as set forth.

In testimony whereof I affix my signature in presence of two witnesses.

SAMUEL F. AMES.

Witnesses:
WM. H. SHEARER,
J. W. BRATEHER.